W. L. SANTMYERS & R. L. HEPNER.
REAMER.
APPLICATION FILED FEB. 25, 1916.
1,217,834.
Patented Feb. 27, 1917.
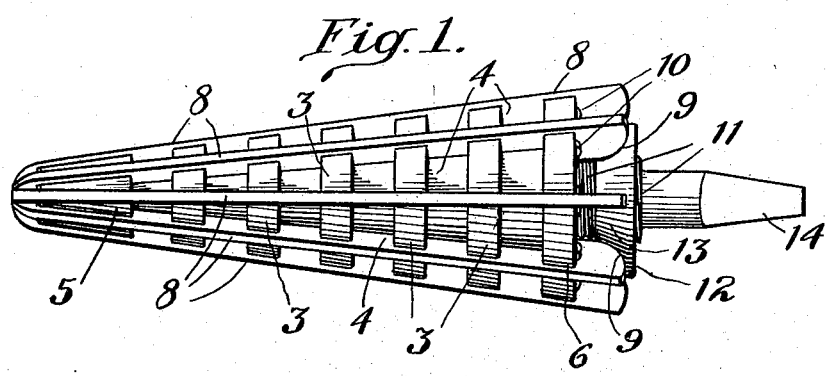
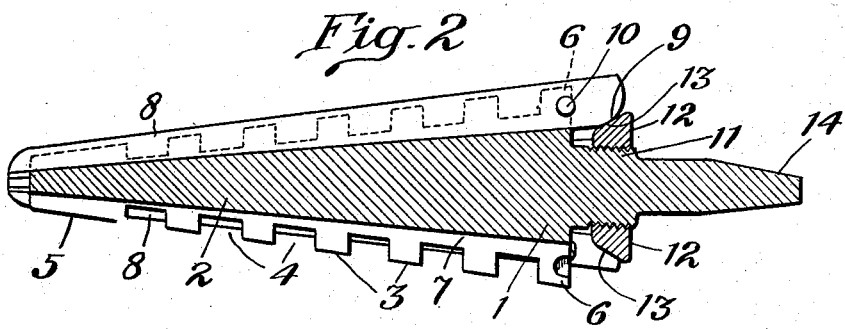
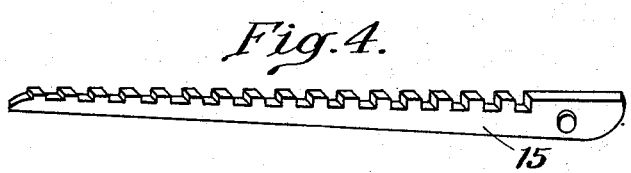
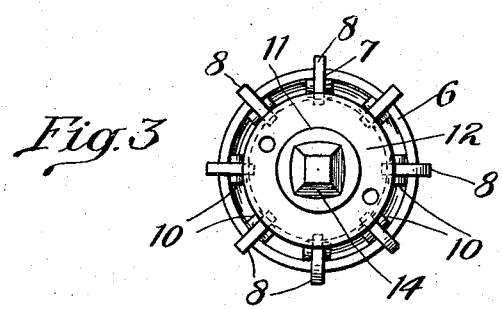

UNITED STATES PATENT OFFICE.

WASHINGTON L. SANTMYERS, OF STRASBURG, AND ROY L. HEPNER, OF TOMSBROOK, VIRGINIA.

REAMER.

1,217,834.  Specification of Letters Patent.  Patented Feb. 27, 1917.

Application filed February 25, 1916. Serial No. 80,519.

*To all whom it may concern:*

Be it known that we, WASHINGTON L. SANTMYERS and ROY L. HEPNER, citizens of the United States, residing at Strasburg, in the county of Shenandoah and State of Virginia, and Tomsbrook, in the county of Shenandoah and State of Virginia, respectively, have invented certain new and useful Improvements in Reamers, of which the following is a specification.

This invention relates to boring and drilling devices, and more particularly to reamers, and has for its object the provision of a reamer having its cutting blades removable, and secured in place by a novel locking and clamping means.

Another object is to provide a device of this character which has a novel reinforced spindle so constructed that it will reinforce and support the cutting blades and prevent their breaking and also prevent the clogging of cuttings.

A further object is to provide a device of the character with blades provided with tap teeth so that it may be used as a tap.

Other objects and advantages such as simplicity, durability, cheapness in manufacture and the general improvement of the art will be more fully brought out in the following specification and accompanying drawings, in which:

Figure 1 is a side view of our improved reamer,

Fig. 2 is a sectional view of our reamer having one blade removed to show the longitudinal groove.

Fig. 3 is a rear end view of same, and

Fig. 4 is a view of a blade having tap teeth cut therein.

Referring more particularly to the drawings, the numeral 1 designates the tapering spindle or main supporting member of the device which comprises a body portion 2 having a plurality of rings 3 formed thereon leaving recesses 4 between said rings for a purpose to be described.

The tapering spindle terminates at its forward end in a head 5, and at its rear end in a conical shell 6. Grooves 7 are formed in shell 6, rings 3, head 5 and the body portion 2 for the reception of blades 8 which have the inner portions of their rear ends curved as shown at 9.

To clamp the blades upon the spindle so that they may be readily removed and replaced we provide the blades with transverse pins 10 which abut against the inner periphery of the shell 6. The clamping means comprises a screw-threaded extension 11 on the rear end of the spindle for carrying a disk 12 which is threaded thereon. The underside 13 of the disk 12 is beveled to contact with the curved edges 9 of the blades 8. The upper face of the disk 12 has holes formed therein for reception of a suitable tool for turning it.

The extension 11 has a chuck engaging member 14 formed thereon for insertion in any desired tool-holder.

A modified form of blade 15 is shown in Fig. 4, this blade has serrations on its cutting edge for cutting threads.

The operation of the device is as follows: Assuming that the device is unassembled the blades 8 are placed in the grooves 7 with pins 10 within the conical shell 6 and the disk 12 is then screwed down against the faces 9 thus clamping the blades securely in place.

The tool is now ready for operation and when in operation the cuttings will deposit in the recesses 4 thus preventing clogging of the device.

Having thus described our invention what we claim is:

1. A reamer comprising a spindle, a plurality of reinforcing rings formed on said spindle, a plurality of blades disposed in slots in said spindle and means operatable longitudinally on said spindle and engaging the ends of said blades for clamping them in said slots.

2. In a reamer having removable blades, a spindle, said spindle comprising a body portion, a plurality of reinforcing rings formed on said body portion, said spindle and said rings having a plurality of slots therein for the reception of blades.

3. A reamer comprising a spindle having a plurality of circumferential recesses therein, a shell formed on the rear of said spindle, and a plurality of cutting blades disposed in said shell and in longitudinal slots in said spindle.

4. A reamer comprisng a spindle having a plurality of circumferential recesses therein, a shell formed on the rear of said spindle, and a plurality of cutting blades disposed in longitudinal slots in said spindle and pivoted in said shell, and a disk screw-threaded on the rear of said spindle and adapted to contact with said blades for clamping them in position.

5. In a reamer having removable blades, a spindle, said spindle comprising a tapering body portion, a plurality of reinforcing rings formed on said body portion, said reinforcing rings being tapered on a line with said body portion, said spindle and said rings having a plurality of slots therein for the reception of blades.

6. A reamer comprising a spindle, a plurality of rings formed on said spindle, a plurality of blades disposed in slots in said spindle and said rings, and means operatable longitudinally on said spindle and engaging the ends of said blades for clamping them in said slots.

7. A reamer comprising a spindle, a plurality of rings formed on said spindle, a conical shell formed on the rear end of said spindle, a plurality of blades disposed in axial grooves in said spindle and said rings and having their rear ends pivotally mounted in said shell, and means operatable longitudinally on said spindle and engaging the ends of said blades for clamping them in said slots.

In testimony whereof we hereunto affix our signatures.

WASHINGTON L. SANTMYERS.
ROY L. HEPNER.

Copies of this patent may be obtained for five cents each, by addressing the "Commissioner of Patents, Washington, D. C."